UNITED STATES PATENT OFFICE.

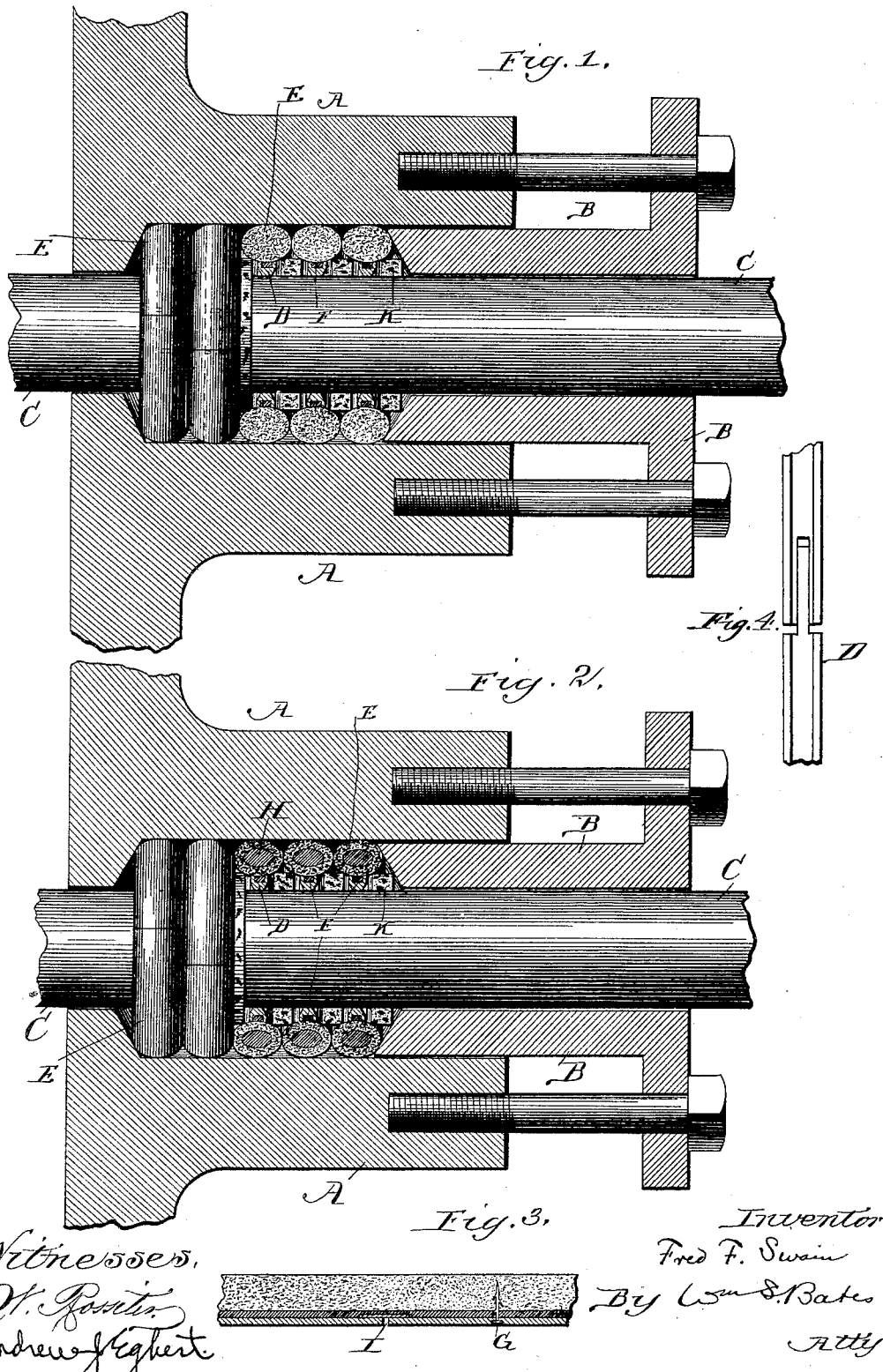

FRED F. SWAIN, OF CHICAGO, ILLINOIS.

PACKING FOR PISTON-RODS.

SPECIFICATION forming part of Letters Patent No. 398,756, dated February 26, 1889.

Application filed October 16, 1888. Serial No. 288,403. (No model.)

*To all whom it may concern:*

Be it known that I, FRED F. SWAIN, of Chicago, Illinois, have invented certain new and useful Improvements in Packing for Piston-Rods and Similar Devices, of which the following is a specification.

The objects of my invention are to provide a packing with a metallic wearing-surface and an elastic backing to hold it against the rod, to avoid a too great bearing-surface of metal upon the rod, to avoid a contact of the elastic body with the rod, and to provide an efficient packing for wet rods or pump-rods.

Other objects will be apparent from the construction of my packing.

To these ends the invention consists in certain devices and combinations specified in the claims at the end hereof.

In the drawings, Figures 1 and 2 are sectional views showing my invention as applied to a piston-rod, and Fig. 3 is a detail view of a piece of packing. Fig. 4 is a detail top view of a metallic ring-joint.

In the drawings, A represents a stuffing-box; B, the gland.

C is a piston-rod.

D are metal rings on the rod C.

E are rings of elastic material, such as rubber or hemp. These rings are preferably of oblong cross-section, as shown, as that form requires less pressure of the gland upon the backing to produce the requisite pressure of the metallic rings on the rod.

F is a tongue or rib secured to one of the flattened sides of the elastic body E and adapted to enter a groove in the metallic ring D, thereby securing the metallic ring and the elastic ring together. This tongue may be made of rubber or other suitable material, and it may be secured to the ring E in any desirable manner. In some cases the rings D and E may be secured together by barbed or other tacks or screws, as shown at G in Fig. 3. The metallic rings D may be made in segments whose meeting ends are tongued together, the tongue on one segment entering a kerf in the other, as indicated in Figs. 1 and 4. This construction of joint holds the segments securely together, and also forms a tight joint and prevents the blowing of steam through the joint.

When the gland is tightened on the packing, the stuffing-box will be filled with a solid mass of elastic material, which, however, will have no contact with the rod, and between this elastic mass and the rod will be a series of rings, D, to take the wear. These rings being comparatively narrow, there will be but a small surface of contact with the rod compared with the length of the stuffing-box, and hence there will be less danger of cutting the rod in case of grit getting into the box. In some cases, to increase the elasticity of the backing-rings, they may be formed with a rubber core or center, as shown at H in Fig. 2.

I in Fig. 3 shows a metal strip or bridge-piece placed in the groove of the metal rings over a joint, for the double purpose of protecting the elastic material back of the metal and to prevent such elastic material being forced into the joint between the metallic segments, and thereby preventing their being closed together as they wear in use.

K are rings of cork or other material of that character arranged in the spaces between the metal rings D in the case of pump-rods or other wet rods.

In the packing which I have used I have found that this combination of elastic backing and metallic wearing-surface with alternate rings of cork forms a perfectly-tight packing on a wet rod, and I have also found that the same packing without the cork forms a perfectly-tight packing on a steam-rod.

This packing being composed of independent metallic rings, each with its own backing to hold it against the rod independently of the others, it can be satisfactorily applied to uneven rods, and one, two, or more rings may be used, as desired.

What I claim is—

1. The combination, substantially as set forth, of a metal wearing-ring composed of sections tongued together and an elastic backing-ring of greater breadth than the metal ring and connected thereto.

2. The combination, substantially as set forth, of a series of independent metallic wearing-rings having a bearing on the rod and an equal series of elastic backing-rings of greater breadth than the metal rings and each connected to its respective metal ring, whereby said metal rings are kept apart or spaced upon the rod.

3. The combination, substantially as set forth, of a series of independent metallic wearing-rings having a bearing on the rod, an equal series of elastic backing-rings of greater breadth than the metal rings and each connected to its respective metal ring to keep said metal rings apart, and one or more cork rings in the spaces between the metal rings.

4. The combination, substantially as set forth, of a metal wearing-ring, an elastic backing-ring, and a bridge-piece over the joint of the metal ring, between it and its backing, to protect the backing and keep the joint clear.

5. The combination, substantially as set forth, of a metal wearing-ring composed of segments tongued together, an elastic backing-ring, and a bridge-piece over each joint of the metal ring.

Witness my hand this 20th of September, A. D. 1888.

FRED F. SWAIN.

Witnesses:
WM. S. BATES,
HENRY L. REXFORD.